Figure 1:
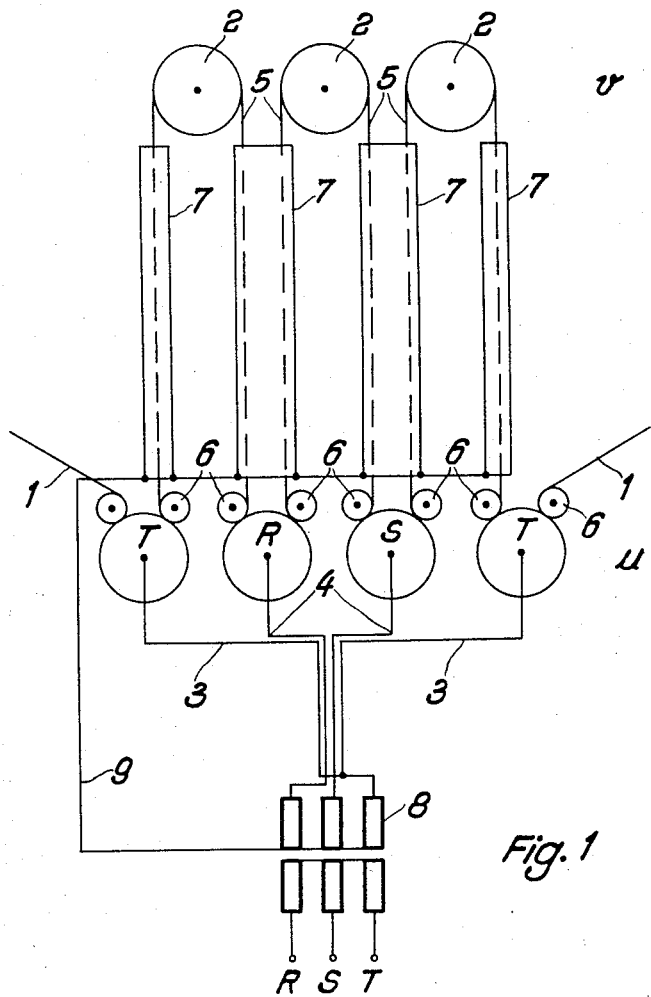

July 7, 1959 F. ALF 2,894,115
METHOD OF AND APPARATUS FOR PROGRESSIVELY HEATING METAL STRIP
BY THE DIRECT PASSAGE OF AN ELECTRIC CURRENT THERETHROUGH
Filed Jan. 16, 1958 2 Sheets-Sheet 2
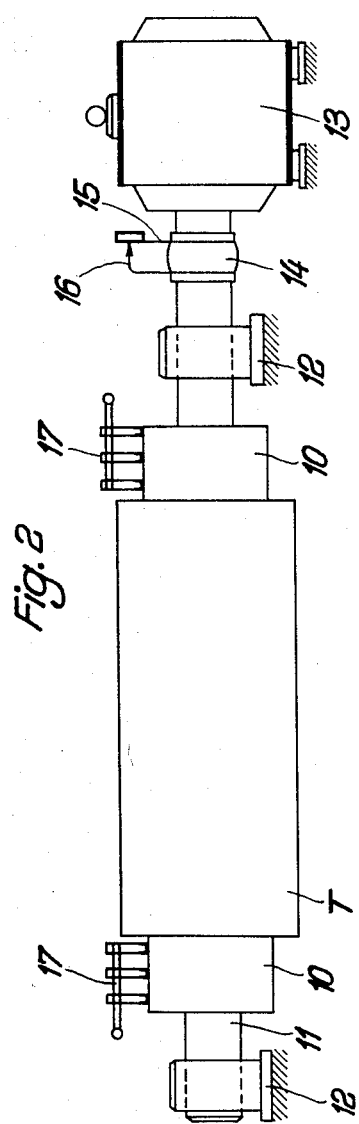
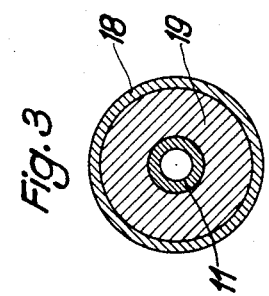
Inventor:
FRITZ ALF
BY: Cushman, Darby & Cushman
ATTORNEYS United States Patent Office
2,894,115
Patented July 7, 1959

2,894,115

METHOD OF AND APPARATUS FOR PROGRESSIVELY HEATING METAL STRIP BY THE DIRECT PASSAGE OF AN ELECTRIC CURRENT THERETHROUGH

Fritz Alf, Remscheid-Hasten, Germany, assignor to Deutsche Edelstahlwerke Aktiengesellschaft, Krefeld, and Allegemeine Elektricitats-Gesellschaft, Berlin-Grunewald, Germany Application January 16, 1958, Serial No. 709,255

Claims priority, application Germany January 22, 1957

14 Claims. (Cl. 219—155)

The present invention relates to a method of and apparatus for progressively heating metal strip by the direct passage of an electric current therethrough.

It is already known to heat metal strip progressively by the direct passage therethrough of an electric current for the purpose for instance of melting down a tin coating that has been previously galvanically applied. The current is fed to the strip through the deflecting rolls. In known apparatus of the said kind two rolls are located a certain distance apart at one level and a third roll is located at a higher level. These three rolls are connected with the secondary winding of a transformer, the upper roll being joined to one pole and the two lower rolls to the other pole. This imposes a single-phase load on the supply mains. Owing to the considerable length of strip between the current supply points an appreciable amount of inductive resistance arises so that the transformer must supply a substantial amount of idle power. Moreover, contact difficulties are often experienced at the rolls and these cause damage to the strip, a grave disadvantage if the strip is required to have a smooth and clean tinned surface.

The invention proposes to overcome these objections and more particularly to distribute the load evenly between three phases of a mains network, and at the same time to reduce the inductive resistance. According to the invention the problem is solved by providing two oppositely located groups of deflecting rolls between which the strip is arranged to travel to and fro. One group comprises four directly juxtaposed rolls of which three are each connected with one phase of the secondary of a high current transformer, the two outside rolls being electrically connected together. Preferably the two inner rolls are connected to one phase each and the two outer rolls are connected with the third phase. The supply leads to the outer rolls are preferably arranged to enclose the conductors feeding the inner rolls.

These arrangements ensure an even distribution of the load between the three phases, which will remain effective even if the velocity of travel of the strip is very high and an output of considerable magnitude is required. The apparent power of the transformer will be appreciably reduced because short and symmetrically arranged feeders to the current feeding rolls can be provided. Apparent power is further reduced by giving the rolls a size that will ensure that the lengths of strip between opposite rolls travel in parallel planes and are as closely adjacent as possible. The current in each phase passes through the travelling lengths of strip in opposite directions, thus greatly reducing inductive resistance. Supplementary rolls are conveniently provided in conjunction with the said equipment to ensure that the strip will travel around the feed rolls in close enveloping contact therewith to reduce the occurrence of contact trouble to a minimum.

In a purely schematic way the accompanying drawings illustrate a preferred embodiment of the invention. In the drawings:

Fig. 1 is a view of the equipment as a whole,
Fig. 2 is a view of the drive means, and
Fig. 3 is a cross section of a contact roll according to a further development of the invention.

The strip 1 which it is desired to heat is arranged to travel to and fro between two groups of rolls. The upper group $o$ comprises three rolls 2, whereas the lower group $u$ consists of four rolls. Current is fed to the strip through these latter four rolls and in the illustrated example the two inner rolls R and S are each connected with one phase of the high current windings 8 of the transformer. The two outer rolls T are connected with the third phase. The supply leads 3 to these two outer rolls T are arranged to enclose the conductors 4 which feed the inner rolls R and S. This provides a completely symmetrical arrangement of the conductors which may at the same time be relatively short because the rolls are in close juxtaposition in one plane.

The diameter of the rolls $o$ which are not supplied with current is arranged to conform with the spacing of the shafts of the rolls comprised in group $u$ in such a way that the lengths of strip travelling between the two sets of rolls will be parallel and arranged in closely adjacent pairs as indicated at 5. To this end it is convenient to provide supplementary rubber rolls 6 for increasing the enveloping angle of the strips as they travel over the rolls of group $u$. The close proximity of the sections of strip which travel between the two sets of rolls, and which carry the current in each phase in opposite directions reduces the apparent output of the transformer.

Owing to the reciprocal travel of the strip between the rolls of group $o$ which are not supplied with current and the rolls in group $u$ which are supplied with current the length of strip between two consecutive feed points is greatly increased by comparison with that in known arrangements of this kind. The greater length of strip between feed points increases the total resistance. It is therefore possible to use a smaller current to achieve the same effect, and this in turn will reduce the difficulties due to bad contact. These contact difficulties are still further reduced by the increase in the enveloping angle of the strip around the current supply rolls due to the provision of the supplementary rolls 6 which thus further diminish contact resistance.

The performance of the plant can be further improved by providing boxes 7 for enclosing the adjacent sections of strip of each pair. These boxes are preferably made of a heat insulating material. It is also an advantage to provide these boxes with a metal lining, and electrically preferably to interconnect the linings of the several boxes besides connecting them by means of a conductor 9 with the star point on the secondary side of the transformer.

It is also preferred to provide the rolls 2 in group $o$ with a temperature-resistant rubber casing. The rubber may be protected from the effect of elevated temperatures in a manner known as such by a coating of silicone. This can be done more particularly if it is desired to heat the strip to temperatures between 200 and 300° as is required for fusing a tin coating on to the strip.

The rubber coated rolls in group $o$ are also best suited for imparting motion to the travelling strip. The danger of slippage between the strip and the driving rolls due to expansion will not be very great if all three rolls are driven by one motor.

However, for other reasons it may not be convenient to drive the rolls in the upper group $o$. In such cases the strip must be driven by the rolls in group $u$ through which the current is fed. To prevent slippage between strip and rolls in this case and consequent damage to the strip surface each roll is then separately driven, a flexible coupling being interposed between motor and roll. Such an arrangement is illustrated in Fig. 2 in diagram form. T represents one of the rolls comprised in group *u* over which the strip 1 is arranged to travel. The shaft 11 of the roll runs in bearings 12 and carries sliprings 10 for the supply of current through brushes 17. The roll is driven by a motor 13 through a flexible coupling 14. The driving member of the coupling carries an arm 15 and the driven member carries a co-operating arm 16. Arm 16 is connected with a wiper which is arranged to slide on a resistor secured to arm 15. The flexible coupling 14 causes the relative angular position of the two arms 15 and 16 to be translated into a resistance which can be used in a manner that is well understood to control the driving motor 13 for the maintenance of constant torque or constant power. The resistance control element may be replaced by any suitable or known capacitive or inductive control means.

In a further development of the invention the flexible coupling may be replaced by a flexible transmission which is established by supporting the contact roll proper on an elastic foundation 19 mounted on the drive shaft, the contact roll 18 encircling this foundation and being fed through flexible current feeding strips connected with the sliprings 10. An arrangement of this kind is illustrated in Fig. 3. Control arms corresponding with arms 15 and 16 in the preceding embodiment are then secured, on the one hand, to shaft 11 and, on the other hand, to the contact roll proper. In this form of construction the relative angular position of the two arms will control the transmitted power or torque. Furthermore, this latter form of construction has the advantage of the rubber foundation between the outside contact roll 18 and the shaft 11 providing a thermal insulation which prevents loss of heat by the strip. Moreover, the cross section of the contact roll 18 can be so chosen that the existing current load will heat it and thus permit it to transfer heat to the strip. In other words, instead of heat being lost by the strip as it travels over the roll, the latter will supply heat to the strip. In such a case it is advisable to use a hollow shaft 11 to allow of internally cooling the same. The object of cooling is definitely to prevent a rise in temperature in the shaft bearings 12.

Both the form of construction shown in Fig. 2 as well as that illustrated in Fig. 3 ensure that slippage between the strip and the roll will not occur and that damage of the strip surface due to this cause will not arise.

What I claim is:

1. A method of progressively heating metal strip by the direct passage therethrough of electrc current which consists in travelling the strip to and fro between two oppositely located groups of deflecting rolls of which one group constitutes the current supply rolls and consists of four juxtaposed rolls of which three are each connected with one phase of the secondary of a high current transformer and of which two rolls constituting outside rolls of the said group are electrically directly interconnected.

2. A method of progressively heating metal strip by the direct passage therethrough of electric current which consists in passing the strip over the strip-deflecting rolls of two opposite groups of such rolls so that it travels to and fro and supplying the said current in three phases only to the rolls of one of said groups consisting of four juxtaposed rolls, one phase to one of said rolls, a second phase to another of said rolls and the third phase to the other two rolls constituting outer rolls of the said group.

3. Apparatus for progressively heating metal strip by the direct passage of current therethrough comprising two oppositely located groups of deflecting rolls, means for travelling the strip between them, and a three phase high current transformer, one of said groups constituting the current supply rolls and consisting of four juxtaposed rolls, three of said rolls being adapted each to be connected to a different phase of the secondary of said transformer and two of said rolls constituting outside rolls of the group being adapted to be electrically interconnected.

4. Apparatus according to claim 3, comprising supply leads to the said outside current-supply rolls and supply leads to the two inner current-supply rolls, said first-mentioned leads enclosing the said supply leads to the two inner rolls.

5. Apparatus according to claim 3, and comprising supplementary rolls co-operating with the rolls of said group of current-supply rolls for increasing the angle of envelopment of the said current supply rolls by the strip.

6. Apparatus according to claim 3, in which the rolls comprised in the group that is not supplied with current are proportioned and arranged in relation to the current-supply rolls so that the reaches of strip travelling between the rolls of the respective groups will comprise parallel pairs the individual reaches of which are spaced closely together in relation to the spacing between one such closely spaced pair and the next, means being provided to ensure that the wrap of the strip around the rolls of one group is to a greater angular extent than the wrap of the strip round the rolls of the other group, said means being arranged so as to ensure that the reaches will be in the required parallelism.

7. Apparatus according to claim 6 in which the said pairs are enclosed in separate boxes comprising heat insulating material and a metal lining.

8. Apparatus according to claim 7, in which the linings of the different boxes are electrically interconnected.

9. Apparatus according to claim 7, in which the linings of the different boxes are electrically connected with a star point of the transformer secondary.

10. Apparatus according to claim 3, having means for driving the rolls that are not supplied with electric current.

11. Apparatus according to claim 3, in which the said rolls that are not supplied with current are encased in a temperature-resistant resilient material and are arranged so that the strip will wrap round at least 180° thereof, and are associated with means for driving them.

12. Apparatus according to claim 3, having means for driving the said group of rolls which constitute the current supply rolls.

13. Apparatus according to claim 3, in which the rolls of one of said groups are the driven rolls and comprising individual drive means for driving each roll and an intermediate flexible coupling associated with each said roll, and arms secured to the members of said coupling, the relatively angular position of said arms being adapted electrically to regulate means controlling the motor for the maintenance of constant power.

14. Apparatus according to claim 13 comprising at least one current-supply roll mounted on a shaft between which and the said roll a rubber sleeve is present which constitutes flexible coupling means.

References Cited in the file of this patent
UNITED STATES PATENTS

| 2,271,723 | Trainer | Feb. 3, 1942 |
| 2,432,801 | Rendel | Dec. 16, 1947 |
| 2,457,870 | Cook | Jan. 4, 1949 |